United States Patent
Lee et al.

(10) Patent No.: US 12,525,614 B2
(45) Date of Patent: Jan. 13, 2026

(54) METHOD OF MANUFACTURING ELECTRODE OF ALL-SOLID-STATE BATTERY AND ELECTRODE OF ALL-SOLID-STATE BATTERY MANUFACTURED USING THE SAME

(71) Applicant: LG Energy Solution, Ltd., Seoul (KR)

(72) Inventors: Suk Woo Lee, Daejeon (KR); Ji Hoon Ryu, Daejeon (KR); Eun Bee Kim, Daejeon (KR); Jung Pil Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 798 days.

(21) Appl. No.: 17/417,300

(22) PCT Filed: May 8, 2020

(86) PCT No.: PCT/KR2020/006084
§ 371 (c)(1),
(2) Date: Jun. 22, 2021

(87) PCT Pub. No.: WO2020/226448
PCT Pub. Date: Nov. 12, 2020

(65) Prior Publication Data
US 2022/0077468 A1     Mar. 10, 2022

(30) Foreign Application Priority Data

May 8, 2019 (KR) .......................... 10-2019-0053692

(51) Int. Cl.
*H01M 4/62* (2006.01)
*H01M 4/04* (2006.01)
*H01M 10/0562* (2010.01)

(52) U.S. Cl.
CPC ......... *H01M 4/623* (2013.01); *H01M 4/0404* (2013.01); *H01M 4/0416* (2013.01); *H01M 10/0562* (2013.01)

(58) Field of Classification Search
CPC .. H01M 4/623; H01M 4/0404; H01M 4/0416; H01M 10/0562
See application file for complete search history.

(56) References Cited

U.S. PATENT DOCUMENTS

| | | |
|---|---|---|
| 2005/0058907 A1 | 3/2005 | Kurihara et al. |
| 2005/0064289 A1 | 3/2005 | Suzuki et al. |

(Continued)

FOREIGN PATENT DOCUMENTS

| | | |
|---|---|---|
| CN | 1684289 A | 10/2005 |
| CN | 101110473 A | 1/2008 |

(Continued)

OTHER PUBLICATIONS

Extended European Search Report including Written Opinion for Application No. 20802994.2 dated Feb. 4, 2022, pp. 1-9.

(Continued)

*Primary Examiner* — Adam A Arciero
(74) *Attorney, Agent, or Firm* — Lerner David LLP (57) ABSTRACT

The present invention relates to a method of manufacturing an electrode of an all-in-one battery comprising the steps of mixing an electrode active material, a solid electrolyte and a first binder with a first solvent to prepare a primary slurry; drying the primary slurry to prepare a mixture powder; mixing the mixture powder, a conductive agent, and a second binder with a second solvent to prepare a secondary slurry; and coating the secondary slurry on a current collector.

14 Claims, 5 Drawing Sheets

(56) References Cited

U.S. PATENT DOCUMENTS

| | | |
|---|---|---|
| 2005/0132562 A1 | 6/2005 | Saito et al. |
| 2005/0271940 A1 | 12/2005 | Fukunaga et al. |
| 2007/0003836 A1 | 1/2007 | Suzuki et al. |
| 2008/0020280 A1 | 1/2008 | Miura et al. |
| 2011/0027661 A1* | 2/2011 | Okazaki ................ H01M 4/525 |
| | | 29/623.5 |
| 2013/0089780 A1 | 4/2013 | Uezono |
| 2014/0162139 A1 | 6/2014 | Hoshiba et al. |
| 2015/0044575 A1* | 2/2015 | Kawaji ............... H01M 10/052 |
| | | 252/62.2 |
| 2015/0147660 A1* | 5/2015 | Fujiki .................... H01M 4/62 |
| | | 29/623.5 |
| 2016/0190565 A1 | 6/2016 | Woo et al. |
| 2016/0268627 A1 | 9/2016 | Lee et al. |
| 2017/0214051 A1 | 7/2017 | Yoon et al. |
| 2017/0324076 A1 | 11/2017 | Lee et al. |
| 2018/0114979 A1 | 4/2018 | Yoon et al. |
| 2019/0260021 A1 | 8/2019 | Woo et al. |
| 2019/0341616 A1 | 11/2019 | Yoon et al. |
| 2021/0036311 A1 | 2/2021 | Matsumura |

FOREIGN PATENT DOCUMENTS

| | | |
|---|---|---|
| CN | 104659334 A | 5/2015 |
| CN | 107039655 A | 8/2017 |
| CN | 107346819 A | 11/2017 |
| JP | 2005051125 A | 2/2005 |
| JP | 2005183287 A | 7/2005 |
| JP | 2010238388 A | 10/2010 |
| JP | 2014241282 A | 12/2014 |
| JP | 2015185252 A | 10/2015 |
| JP | 2017135094 A | 8/2017 |
| JP | 2017152147 A | 8/2017 |
| JP | 2018120845 A | 8/2018 |
| KR | 20140074176 A | 6/2014 |
| KR | 20150060517 A | 6/2015 |
| KR | 20160108932 A | 9/2016 |
| KR | 101673724 B1 | 11/2016 |
| KR | 20170089333 A | 8/2017 |
| KR | 101774683 B1 | 9/2017 |
| KR | 20180043887 A | 5/2018 |
| KR | 20180073442 A | 7/2018 |
| KR | 20180110757 | 10/2018 |
| WO | 2019065030 A1 | 4/2019 |

OTHER PUBLICATIONS

International Search Report for Application No. PCT/KR2020/006084, mailing Aug. 18, 2020, 2 pages.

* cited by examiner

METHOD OF MANUFACTURING ELECTRODE OF ALL-SOLID-STATE BATTERY AND ELECTRODE OF ALL-SOLID-STATE BATTERY MANUFACTURED USING THE SAME

CROSS-REFERENCE TO RELATED APPLICATION(S)

This present application is a national phase entry under 35 U.S.C. § 371 of International Application No. PCT/KR2020/006084 filed May 8, 2020, which claims priority from Korean Patent Application No. 10-2019-0053692 filed May 8, 2019, all of which are incorporated herein by reference.

TECHNICAL FIELD

The present invention relates to a method of manufacturing an electrode of an all-solid-state battery and an electrode of an all-solid-state battery manufactured using the same, and more particularly to a method of manufacturing an electrode of an all-solid-state battery having improved energy density by using two kinds of binders in manufacturing the electrode of the all-solid-state battery and changing a step in which a conductive agent is added and an electrode of all-solid-state battery manufactured using the same.

BACKGROUND ART

A lithium ion secondary battery, which is a kind of lithium secondary batteries, has advantages of high energy density, low self-discharging rate, and a long lifespan compared to nickel manganese batteries or nickel cadmium batteries, but has been pointed out as disadvantages such as stability problem with overheating and low output.

In order to overcome the problems of a lithium ion secondary battery, an all-solid-state battery has been proposed as an alternative. The all-solid-state battery may be configured to have a structure in which the all-solid-state battery comprises an electrolyte layer including a solid electrolyte, a positive electrode layer including a solid electrolyte, and a negative electrode layer including a solid electrolyte, wherein the positive electrode layer and the negative electrode layer are formed on opposite surfaces of the electrolyte layer, and in which a current collector is coupled to each electrode.

The positive electrode layer and the negative electrode layer of the all-solid-state battery using the solid electrolyte are made of a mixture of an electrode active material, the solid electrolyte and a conductive agent, and a contact surface between the electrode active material and the solid electrolyte is likely to be formed non-uniformly. When a lithium ion secondary battery uses a liquid electrolyte, a contact between an electrode active material and the electrolyte is easily performed because the electrolyte is in a liquid state. However, since the all-solid-state battery has the electrolyte in a solid state, a contact between the electrode active material and the solid electrolyte is not uniform at the interface. As a result, the efficiency and energy density of the all-solid-state battery are reduced.

Figure 1:
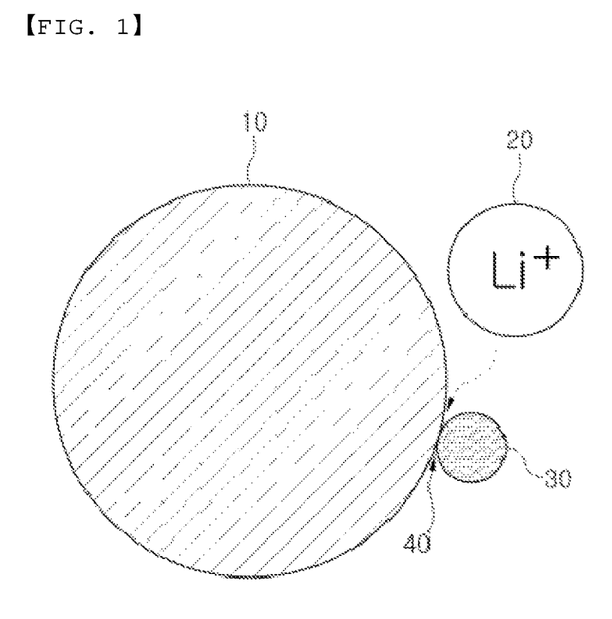
FIG. 1 is a schematic view showing a state in which a triple point is formed in an electrode of an all-solid-state battery.

FIG. 1 shows a state in which a triple point is formed in an electrode of an all-solid-state battery. Referring to FIG. 1, a point on which an electrode active material 10, a conductive agent 30, and a solid electrolyte 20 including lithium ions are commonly abut is formed, and this point is referred to as a triple point 40. Since the triple point is a point at which an electrochemical reaction occurs in an electrode, it is preferable to have many electrochemical reactions occur by forming many triple points in the electrode.

A compression molding method has been used as a manufacturing method of the all-solid secondary battery. For example, the compression molding method includes sequentially adding and pressing component powders of a battery in a cylindrical mold, and combining current collectors on a positive electrode and a negative electrode. However, the compression molding method has a problem in that since it is difficult to uniformly deposit a positive electrode layer on an electrolyte layer, uniform current distribution in the positive electrode is not formed, such that deviation of current density may be caused, which may deteriorate performance of the battery.

In addition, when the electrode active material, the solid electrolyte, the conductive agent and a binder are simultaneously mixed, the electrode active material may be isolated by the conductive agent within the electrode structure (dead electrode active material) or the solid electrolyte may be isolated by the electrode active material within the electrode structure (dead solid electrolyte), thereby not only wasting the electrode active material and the solid electrolyte unnecessarily, but also having a problem of lowering the energy density because a pathway of lithium ions is blocked.

Figure 2:
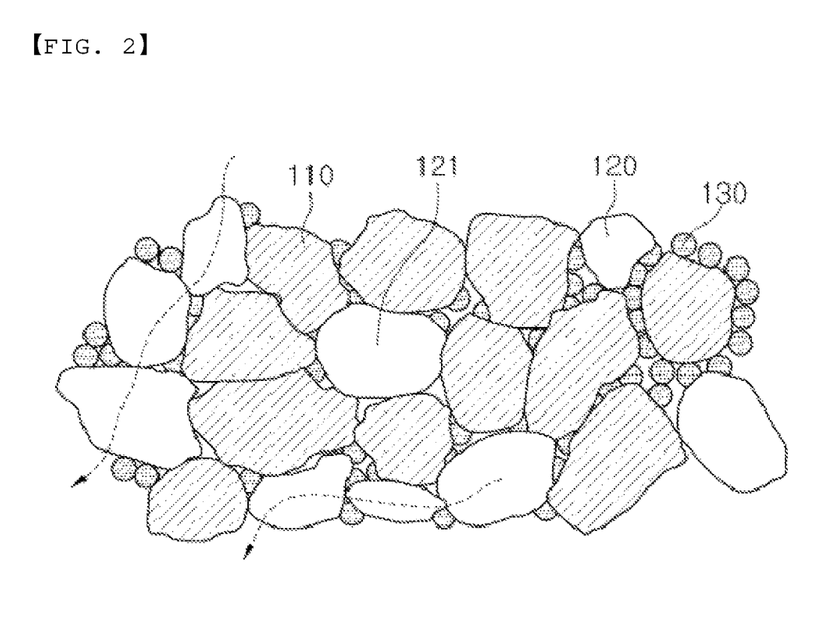
FIG. 2 is a schematic view showing a pathway of lithium ions in an electrode of a conventional all-solid-state battery.

In this regard, FIG. 2 is a schematic view showing a pathway of lithium ions in an electrode of a conventional all-solid-state battery. The electrode of FIG. 2 is manufactured by a method of simultaneously mixing an electrode active material 110, solid electrolytes 120 and 121, and a conductive agent 130. The solid electrolyte 121 located in the center becomes isolated by the active material, and thus cannot be used as a pathway of migrating lithium ions (indicated by a dotted line). As described above, the isolated solid electrolyte 121 that is not able to participate in forming a triple point corresponds to an unnecessary solid electrolyte. Therefore, it is necessary to reduce such unnecessary solid electrolyte and increase the content of solid electrolyte actually participating in electrochemical reactions.

Patent Document 1 discloses an electrode active material slurry comprising a clustered complex and a slurry solution, wherein the clustered complex comprises an electrode active material, a solid electrolyte, a conductive agent, and a first binder in a form of particles having an average particle size ($D_{50}$) of about 0.01 μm to 10 μm, and the slurry solution comprises a solvent and a second binder, the second binder being a hydrocarbon-based polymer in a surface-contact form. However, Patent Document 1 discloses only a process of mixing the electrode active material, the solid electrolyte, the conductive agent, and the binder together, and thus the above problem has not been solved.

Patent Document 2 discloses an electrode including an active material layer in which a binding body containing a Li-M-P composite oxide (wherein M is at least one selected from the group consisting of Fe, Mn, Co, Ni, and VO), a conductive assistant and a first resin is dispersed in a second resin different from the first resin.

Patent Document 2 relates to the electrode for a lithium ion secondary battery using an electrolyte solution, and as in Patent Document 1, a solution to the above problem has not yet been proposed.

Patent Document 3 discloses an all-solid-state secondary battery including a first binder that is insoluble in a non-polar solvent and is non-continuously present in at least one of a positive electrode layer, a negative electrode layer, and a solid electrolyte layer, and a second binder that is soluble in non-polar solvent and is continuously present in at least one of the positive electrode layer, the negative electrode layer, and the solid electrolyte layer, wherein a solubility parameter of the first binder and a solubility parameter of the second binder are different from each other.

Although Patent Document 3 uses two kinds of binders when manufacturing the all-solid-state secondary battery, a technology capable of solving the problem of blocking a pathway of lithium ions by uniformly mixing a mixture of an active material, a conductive agent, and a solid electrolyte when manufacturing an electrode has not yet been proposed.

Patent Document 4 discloses a method for manufacturing a positive electrode of an all-solid-state lithium battery, the method comprising steps of preparing a mesoporous conductive agent-solid electrolyte nanocomposite by uniformly dispersing a solid electrolyte in pores of the mesoporous conductive agent; preparing a mesoporous conductive agent-solid electrolyte-$Li_2X$ monocomposite by coating the mesoporous conductive agent-solid electrolyte nanocomposite on a surface of $Li_2X$ (where X is any one of S, Se, or Te) particles; and connecting a plurality of mesoporous conductive agent-solid electrolyte-$Li_2X$ monocomposites to each other using a binder.

Patent Document 4 discloses the method for manufacturing a positive electrode of an all-solid-state battery, but discloses only a method for providing a high-efficiency all-solid-state battery using a modified form of a conductive agent and $Li_2X$ particles.

Therefore, there is a high need for a technology capable of increasing the energy density by minimizing the amount of unnecessary solid electrolyte while expanding a pathway of lithium ions in an electrode of an all-solid-state battery.

PRIOR ART DOCUMENTS (Patent Document 1) Korean Patent No. 1774683 (2017 Aug. 29)
(Patent Document 2) Japanese Patent Application Publication No. 2015-185252 (2015 Oct. 22)
(Patent Document 3) Korean Patent Application Publication No. 2015-0060517 (2015 Jun. 3)
(Patent Document 4) Korean Patent No. 1673724 (2016 Nov. 1)

DISCLOSURE

Technical Problem

The present invention has been made in view of the above problems, and while a manufacturing process of an all-solid-state battery is configured in a sequential step, different kinds of binders are used in each step and a conductive agent is added only in a preparation step of a secondary slurry. Through this, it is possible to manufacture an electrode having many triple points in which an electrode active material, a solid electrolyte, and the conductive agent are in common contact. It is an object of the present invention to provide a method of manufacturing an electrode of an all-solid-state battery having improved energy density and an electrode manufactured using the same.

Technical Solution

In order to accomplish the above object, the present invention provides a method of manufacturing an electrode of an all-solid-state battery, the method comprising the steps of mixing an electrode active material, a solid electrolyte and a first binder with a first solvent to prepare a primary slurry; drying the primary slurry to prepare a mixture powder; mixing the mixture powder, a conductive agent, and a second binder with a second solvent to prepare a secondary slurry; and coating the secondary slurry on a current collector.

The first binder may be soluble in the first solvent and not soluble in the second solvent.

The first binder and the second binder may be of different kinds.

The first solvent may be a non-aqueous solvent, the first binder may be a non-aqueous binder, the second solvent may be an aqueous solvent, and the second binder may be an aqueous binder.

In particular, the first solvent may be N-methylpyrrolidone (NMP), acrylonitrile (ACN), dimethylformamide (DMF) or dimethyl sulfoxide (DMSO); the first binder may be one or a mixture of two or more selected from the group consisting of N,N-bis[3-(triethoxysilyl)propyl]urea, polyethylene oxide (PEO), poly(vinylidenefluoride) (PVDF) and poly (vinylidenefluoride-co-hexafluoropropylene) (PVDF-co-HFP); the second solvent may be water; and the second binder may be one or a mixture of two or more selected from the group consisting of styrene-butadiene rubber (SBR), butadiene rubber (BR), nitrile-butadiene rubber (NBR), styrene-butadiene-styrene block polymer (SBS), styrene-ethylene-butadiene block polymer (SEB), styrene-(styrene-butadiene)-styrene block polymer, styrene-butadiene rubber-carbonylmethyl cellulose (SBR-CMC), natural rubber (NR), isoprene rubber (IR), ethylene-propylene-diene terpolymer (EPDM), polyvinyl alcohol (PVA), polyacrylic acid (PAA) and poly(ethylene-co-propylene-co-5-methylene-2-norbornene).

An average particle diameter of the conductive agent may be tens of nanometers or less.

The electrode active material and the solid electrolyte form a uniform contact surface in the primary slurry.

The conductive agent added in step (c) may be disposed in pores between the electrode active material and the solid electrolyte.

The electrode active material, the solid electrolyte and the conductive agent of the secondary slurry may form a common contact point and may be in a state of being mixed.

The solid electrolyte may be further added in step (c).

An amount of the solid electrolyte contained in the secondary slurry may be 5 weight % to 10 weight % based on the total solid content.

The present invention provides an electrode of an all-solid-state battery manufactured by the method of manufacturing the electrode of the all-solid-state battery.

In addition, the present invention provides a secondary battery including the electrode of the all-solid-state battery.

BEST MODE

An all-solid-state battery is provided with a positive electrode and a negative electrode, and is configured to have a structure in which a solid electrolyte is interposed therebetween.

The electrode of the all-solid-state battery may have a structure in which an electrode active material is formed on an electrode current collector. Alternatively, the electrode current collector may be omitted depending on the structure.

As a common method of manufacturing an electrode of an all-solid-state battery, a dry compression process is used in which an electrode active material, a conductive agent, and a solid electrolyte are prepared in powder form, then charged into a predetermined mold and then pressed. Alternatively, a slurry coating process is used in which electrode compositions are mixed together with a solvent and a binder to prepare a slurry composition, which is coated and then dried.

A method of manufacturing an electrode of an all-solid-state battery according to the present invention may be performed using a wet process for preparing a slurry including a binder and a solvent in the form of a composition, as described above.

Particularly, the method of manufacturing an electrode of an all-solid-state battery according to the present invention comprises the steps of mixing an electrode active material, a solid electrolyte and a first binder with a first solvent to prepare a primary slurry; drying the primary slurry to prepare a mixture powder; mixing the mixture powder, a conductive agent, and a second binder with a second solvent to prepare a secondary slurry; and coating the secondary slurry on a current collector, wherein the first binder used in the preparation of the primary slurry and the second binder used in the preparation of the secondary slurry may be of different kinds.

In the process of manufacturing a conventional electrode for an all-solid-state battery, when an electrode active material, a solid electrolyte, a conductive agent, and a binder are all mixed together, they may not be uniformly mixed with each other, and a part of the solid electrolyte may be isolated while being surrounded by the electrode active material, or a part of the electrode active material may be isolated while being surrounded by the solid electrolyte. Therefore, the solid electrolyte and the electrode active material, which are not used as a pathway for lithium ions and take up space unnecessarily, may increase. Each of the solid electrolyte and the electrode active material, which does not play a unique role, is referred to as a dead solid electrolyte and a dead electrode active material.

In order to solve the above problem, the present invention adds the conductive agent during the preparation of the secondary slurry, not during the preparation of the primary slurry.

In particular, after preparing the primary slurry in which the electrode active material, the solid electrolyte and the first binder are mixed, and the primary slurry is dried to prepare a mixture powder comprising particles of the electrode active material, the solid electrolyte and the first binder. The mixture powder has a form in which the electrode active material and the solid electrolyte are bonded through the first binder, and the electrode active material and the solid electrolyte are uniformly mixed to form a wide contact surface. Thereafter, the secondary slurry is prepared by mixing the mixture powder, the conductive agent, and the second binder with the second solvent.

It should be noted that the first binder constituting the mixture powder is not dissolved in the second solvent, and the bonding state of the electrode active material and the solid electrolyte is maintained.

This is because when the first binder is dissolved in the second solvent, the bond between the electrode active material and the solid electrolyte in the mixture powder is broken and the uniformly bonded form disappears. In other words, when the first binder is dissolved in the second solvent, the bond formed in the primary slurry is not maintained, so even if the conductive agent is added during the preparation of the secondary slurry, it is difficult to achieve the purpose for increasing a part formed a triple point in which the electrode active material, the solid electrolyte, and the conductive agent are simultaneously contacted.

Therefore, it is preferable that the first binder and the second binder have different solubility. Particularly, the first binder may be dissolved in the first solvent and may not be dissolved in the second solvent. For example, the first binder may be a non-aqueous binder, and the second binder may be an aqueous binder.

The non-aqueous binder may be one or a mixture of two or more selected from the group consisting of N,N-bis[3-(triethoxysilyl)propyl]urea, polyethylene oxide (PEO), poly(vinylidene fluoride) (PVDF) and poly(vinylidene fluoride-co-hexafluoropropylene) (PVDF-co-HFP).

The aqueous binder may be one or a mixture of two or more selected from the group consisting of styrene-butadiene rubber (SBR), butadiene rubber (BR), nitrile butadiene rubber (NBR), styrene-butadiene-styrene block polymer (SBS), styrene-ethylene-butadiene block polymer (SEB), styrene-(styrene-butadiene)-styrene block polymer, styrene-butadiene rubber-carbonyl methyl cellulose (SBR-CMC), natural rubber (NR), isoprene rubber (IR), ethylene-propylene-diene terpolymer (EPDM) and poly(ethylene-co-propylene-co-5-methylene-2-norbornene).

The first solvent may be N-methylpyrrolidone (NMP), acrylonitrile (ACN), dimethylformamide (DMF) or dimethyl sulfoxide (DMSO), and the second solvent may be water.

The electrode active material may be a positive electrode active material or a negative electrode active material, and the active material may be an active material commonly used for a positive electrode or a negative electrode of a secondary battery.

For example, a positive electrode active material used for the positive electrode is not particularly restricted as long as the positive electrode active material is capable of reversibly storing and releasing lithium ions. For example, the positive electrode active material may be a layered compound, such as lithium cobalt oxide ($LiCoO_2$), lithium nickel oxide ($LiNiO_2$), $Li[Ni_xCo_yMn_zM_v]O_2$ (in this equation, M is one or two or more selected from the group consisting of Al, Ga, and In; and $0.3 \le x < 0.1$, $0 \le y$, $z \le 0.5$, $0 \le v \le 0.1$, and $x+y+z+v=1$), $Li(Li_aM_{b-a-b}M'_{b'})O_{2-c}A_c$ (in this equation, $0 \le a \le 0.2$, $0.6 \le b \le 1$, $0 \le b' \le 0.2$, and $0 \le c \le 0.2$; M includes Mn and at least one selected from the group consisting of Ni, Co, Fe, Cr, V, Cu, Zn, and Ti; M' is at least one selected from the group consisting of Al, Mg, and B; and A is at least one selected from the group consisting of P, F, S, and N) or a compound substituted with one or more transition metals; a lithium manganese oxide represented by the chemical formula $Li_{1+y}Mn_{2-y}O_4$ (where y ranges from 0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-y}M_yO_2$ (where M=Co, Mn, Al, Cu, Fe, Mg, B, or Ga, and $0.01 \leq y \leq 0.3$); a lithium manganese composite oxide represented by the chemical formula $LiMn_{2-y}M_yO_2$ (where M=Co, Ni, Fe, Cr, Zn, or Ta, and 0.01y 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; and $Fe_2(MoO_4)_3$. However, the present invention is not limited thereto.

A carbon material capable of storing and releasing lithium ions, lithium metal, silicon, or tin may be generally used as a negative electrode active material used for the negative electrode. Preferably, the carbon material may be used. Both low-crystalline carbon and high-crystalline carbon may be used as the carbonaceous material. Typical examples of the low-crystalline carbon include soft carbon and hard carbon. Typical examples of the high-crystalline carbon include various kinds of high-temperature sintered carbon, such as natural graphite, Kish graphite, pyrolytic carbon, mesophase pitch based carbon fiber, meso-carbon microbeads, mesophase pitches, and petroleum or coal tar pitch derived cokes.

The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; conductive tubes such as carbon nanotubes; metallic powder, such as carbon fluoride powder, aluminum powder, or nickel powder; conductive whisker, such as a zinc oxide or potassium titanate; a conductive metal oxide, such as a titanium oxide; or a conductive material, such as a polyphenylene derivative, may be used as the conductive agent.

The solid electrolyte may be an organic solid electrolyte and an inorganic solid electrolyte. The organic solid electrolyte may include, for example, polyethylene derivatives, polyethylene oxide derivatives, polypropylene oxide derivatives, phosphoric acid ester polymer, poly agitation lysine, polyester sulfide, polyvinyl alcohol, polyvinylidene fluoride, a polymer containing an ionic dissociative group, and the like.

The inorganic solid electrolyte may include, for example, nitrides, halides and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

The conductive agent according to the present invention is preferably disposed in pores between the electrode active material and the solid electrolyte, which are uniformly mixed, and the conductive agent may have an average particle diameter of tens of nanometers or less, or several nanometers.

Meanwhile, the solid electrolyte may be further added in the step of preparing the secondary slurry. That is, a portion of the total solid electrolyte included in the finished electrode may be added during the preparation of the primary slurry, and the remaining solid electrolyte may be added during the preparation of the secondary slurry. Alternatively, in order to minimize the amount of unnecessary solid electrolyte that cannot participate in the electrochemical reaction in the finished electrode, a small amount of the solid electrolyte is added during the preparation of the primary slurry, and the solid electrolyte may be added during the preparation of the secondary slurry after determining the amount of the solid electrolyte required additionally in consideration of the bonding state of the primary slurry.

As the electrode of the all-solid-state battery provided by the present invention may reduce the amount of unnecessary solid electrolyte, the content of the solid electrolyte included in the secondary slurry may be 5 weight % to 10 weight % based on the total solid content, specifically, it may be 5 weight % to 7 weight %.

The electrode of the all-solid-state battery manufactured by the method described above and a lithium secondary battery including the electrode of the all-solid-state battery may be the lithium secondary battery having high energy density characteristics.

Hereinafter, the present invention will be described with reference to the following embodiments. However, the following embodiments are provided only for illustration of the present invention and should not be construed as limiting the scope of the present invention.

EXAMPLE 45 g of $LiNi_{0.8}Co_{0.1}Mn_{0.1}O_2$ as a positive electrode active material, 3.5 g of a solid electrolyte, and 0.4 g of PVDF as a binder were added to an N-methyl pyrrolidone solvent and mixed to prepare a primary slurry in a state in which the electrode active material and the solid electrolyte are uniformly mixed.

The primary slurry was dried to completely evaporate the solvent to prepare a mixture powder. 40 g of the mixture powder, 0.613 g of carbon black having an average particle diameter of 20 nm to 30 nm as a conductive agent, and 0.286 g of a styrene-butadiene rubber-carbonyl methyl cellulose (SBR-CMC) copolymer as a binder were added to water and mixed to prepare a secondary slurry in which many triple points were formed by inserting the conductive agent into pores of the solid electrolyte and the positive electrode active material. (Final composition=positive electrode active material:conductive agent:total binder:solid electrolyte=90:1.5:1.5:7)

Figure 3:
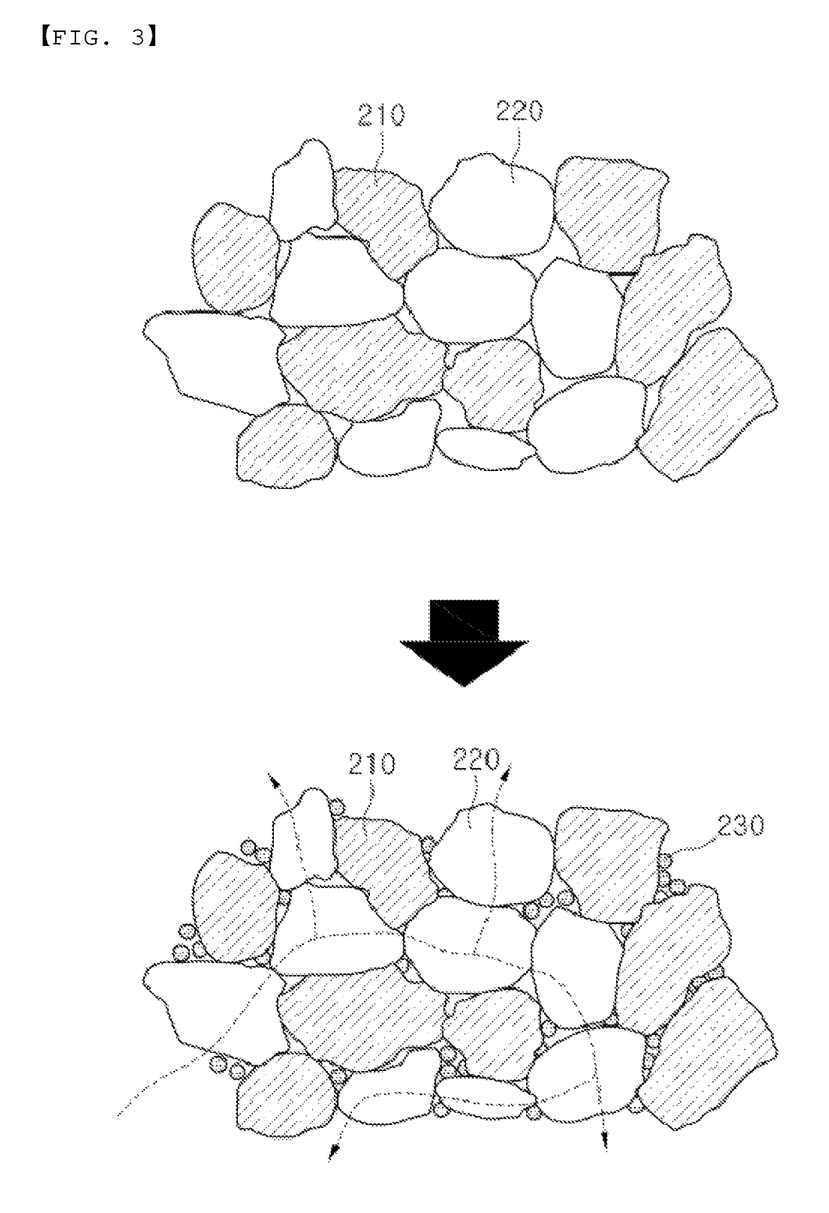
FIG. 3 is a schematic view showing a state of a primary slurry and a secondary slurry prepared in a method of manufacturing an electrode of an all-solid-state battery according to the present invention.

FIG. 3 is a schematic view showing a state of a primary slurry and a secondary slurry prepared in a method of manufacturing an electrode of an all-solid-state battery according to the present invention.

Referring to FIG. 3, a slurry shown above in FIG. 3 is the primary slurry in which an electrode active material 210 and an solid electrolyte 220 are bonded by a first binder (not shown). A slurry shown below in FIG. 3 is the secondary slurry in which a conductive agent 230 and a second binder (not shown) are further added to the primary slurry.

The first binder has a property that does not dissolve in a solvent added during the preparation of the secondary slurry, and thus the bonding state of the electrode active material 210 and the solid electrolyte 220 formed in the primary slurry in the mixture powder is maintained. The conductive agent 230 added during the preparation of the secondary slurry has a particle diameter of 20 nm to 30 nm and is interposed in pores of the mixture powder, so that the electrode active material and the solid electrolyte isolated by the conductive agent are not formed in an isolated form.

Therefore, since the pathway of lithium ions is not blocked, the electrochemical reaction is more actively performed, and thus it is possible to provide a lithium secondary battery with improved performance.

Comparative Example 45 g of $LiNi_{0.8}Co_{0.1}Mn_{0.1}O_2$ as a positive electrode active material, 6.78 g of a solid electrolyte, 0.81 g of carbon black having an average particle diameter of 20 nm to 30 nm as a conductive agent, and 1.62 g of PVDF as a binder were added to an N-methyl pyrrolidone solvent and mixed to prepare a positive electrode slurry. (Final composition=positive electrode active material:conductive agent:binder:solid electrolyte=83:1.5:3:12.5)

Experimental Example 1

Measurement of Total Capacity and Rate Characteristics of Coin Half Cell

The positive electrode slurries prepared in Example and Comparative Example were coated on aluminum current collectors, then dried and rolled to prepare positive electrodes. Coin half cell batteries were manufactured using the positive electrodes.

The coin half cells were charged to 4.25 V at 0.1 C using an electrochemical charging and discharging device, and then discharged to 3.0 V at 0.1 C, 0.3 C, 0.5 C and 1.0 C. The capacities of the coin half cells per weight of the active material at a low rate were measured and shown in FIG. 4.

Figure 5:
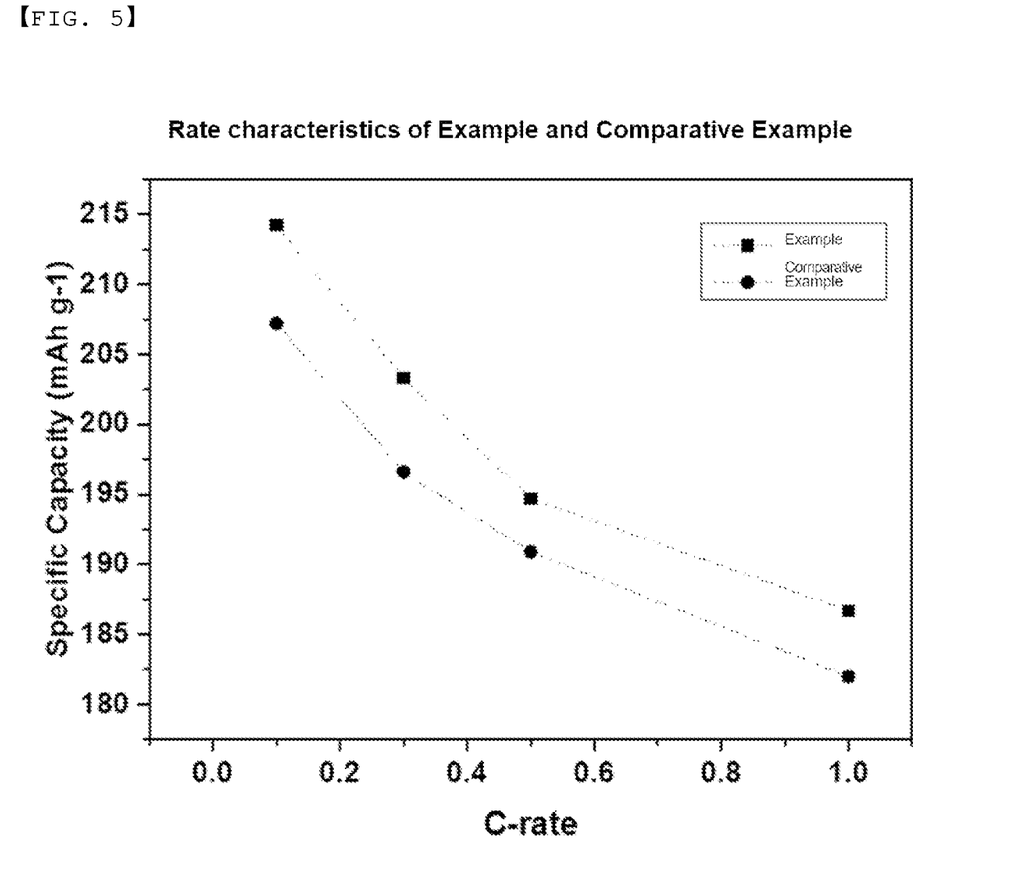
FIG. 5 is a graph showing charge-discharge profiles of coin half cells including positive electrodes prepared in Example and Comparative Example.

In addition, the result of measuring specific capacities according to the discharge rate was shown in FIG. 5.

Figure 4:
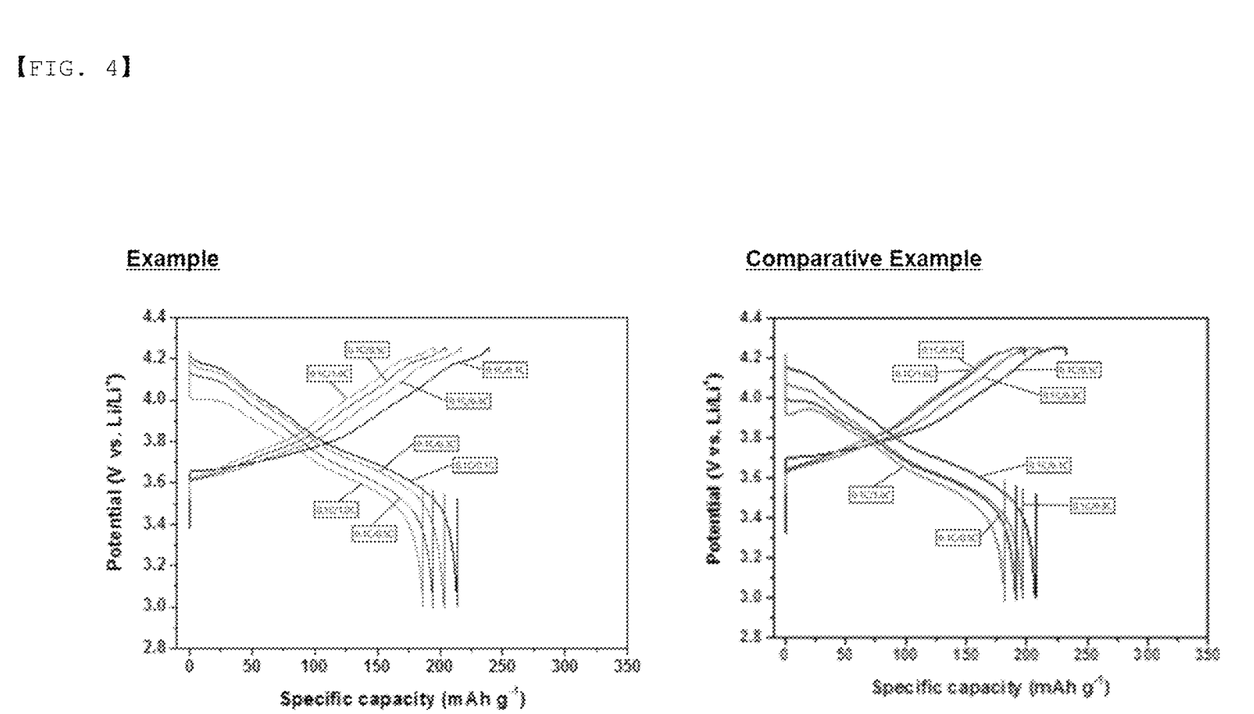
FIG. 4 is a graph showing capacities per weight of active materials at a low rate of coin half cells including positive electrodes prepared in Example and Comparative Example.

Referring to FIG. 4, the capacity per weight at low rate of Example was measured to be about 214 mAh/g, and the capacity per weight at low rate of Comparative Example was measured to be about 207 mAh/g. Therefore, it can be seen that the coin half cell using the positive electrode prepared in Example has a higher capacity per weight.

Meanwhile, the total capacity of the electrodes prepared in Example and Comparative Example can be obtained by multiplying the weight of the active material of each electrode by the capacity per weight, respectively. Therefore, the total capacity of the electrode prepared in Example is 2.6 mAh (=13.5 mg*0.9*214 mAh/g), and the total capacity of the electrode prepared in Comparative Example is 2.1 mAh (=12.2 mg*0.83*207 mAh/g).

In other words, even though the positive electrode of Example has a large amount of active material in the electrode and a low solid electrolyte content compared to the positive electrode of Comparative Example, the positive electrode of Example has an excellent capacity per weight and an effect of improving the total electrode capacity.

Referring to FIG. 5, the specific capacity of the coin half cell including the positive electrode of Example is always measured larger than the specific capacity of the coin half cell including the positive electrode of Comparative Example, regardless of the magnitude of the C-rate.

Therefore, it can be seen that the positive electrode prepared in Example exhibits a higher energy density when the positive electrode of the same weight is used.

Those skilled in the art to which the present invention pertains will appreciate that various applications and modifications are possible based on the above description, without departing from the scope of the present invention.

DESCRIPTION OF REFERENCE NUMERALS

10, 110, 210: Electrode active materials
20, 120, 121, 220: Solid electrolytes
30, 130, 230: Conductive agents
40: Triple point

INDUSTRIAL APPLICABILITY

As is apparent from the above description, a method of manufacturing an electrode of an all-solid-state battery according to the present invention provides an electrode active material, a solid electrolyte, and a conductive agent uniformly mixed to increase the triple point at which the electrode active material, the solid electrolyte, and the conductive agent are simultaneously contacted, thereby improving the conductivity of lithium ions.

As a result, it is possible to reduce the amount of the electrode active material and the solid electrolyte which have been used in excess to increase the ion conductivity in the past.

Accordingly, a secondary battery including the electrode of the all-solid-state battery manufactured using the method described above can exhibit improved energy density.

The invention claimed is:

1. A method of manufacturing an electrode of an all-solid-state battery, the method comprising:
    (a) mixing an electrode active material, a solid electrolyte and a first binder with a first solvent to prepare a primary slurry;
    (b) drying the primary slurry to prepare a mixture powder;
    (c) mixing the mixture powder, a conductive agent, and a second binder with a second solvent to prepare a secondary slurry; and
    (d) coating the secondary slurry on a current collector.

2. The method according to claim 1, wherein the first binder is soluble in the first solvent and not soluble in the second solvent.

3. The method according to claim 1, wherein the first binder and the second binder are of different kinds.

4. The method according to claim 2, wherein the first solvent is a non-aqueous solvent, the first binder is a non-aqueous binder, the second solvent is an aqueous solvent, and the second binder is an aqueous binder.

5. The method according to claim 4, wherein the first solvent is N-methylpyrrolidone (NMP), acrylonitrile (ACN), dimethylformamide (DMF) or dimethyl sulfoxide (DMSO); the first binder is one or a mixture of two or more selected from the group consisting of N,N-bis [3-(triethoxysilyl)propyl]urea, polyethylene oxide (PEO), poly(vinylidenefluoride) (PVDF) and poly (vinylidenefluoride-co-hexafluoropropylene) (PVDF-co-HFP); the second solvent is water; and the second binder is one or a mixture of two or more selected from the group consisting of styrene-butadiene rubber (SBR), butadiene rubber (BR), nitrile-butadiene rubber (NBR), styrene-butadiene-styrene block polymer (SBS), styrene-ethylene-butadiene block polymer (SEB), styrene-(styrene-butadiene)-styrene block polymer, styrene-butadiene rubber-carbonyl methyl cellulose (SBR-CMC), natural rubber (NR), isoprene rubber (IR), ethylene-propylene-diene terpolymer (EPDM), polyvinyl alcohol (PVA), polyacrylic acid (PAA) and poly(ethylene-co-propylene-co-5-methylene-2-norbornene).

6. The method according to claim 1, wherein the electrode active material and the solid electrolyte form a uniform contact surface in the primary slurry.

7. The method according to claim 1, wherein the conductive agent added in step (c) is disposed in pores between the electrode active material and the solid electrolyte.

8. The method according to claim 1, wherein the electrode active material, the solid electrolyte and the conductive agent of the secondary slurry form a common contact point and are in a state of being mixed.

9. The method according to claim 1, wherein an additional solid electrolyte is further added in step (c).

10. The method according to claim 1, wherein an amount of the solid electrolyte contained in the secondary slurry is 5 weight % to 10 weight % based on a total solid content.

11. An electrode of an all-solid-state battery manufactured using a method comprising:
   (a) mixing an electrode active material, a solid electrolyte and a first binder with a first solvent to prepare a primary slurry;
   (b) drying the primary slurry to prepare a mixture powder;
   (c) mixing the mixture powder, a conductive agent, and a second binder with a second solvent to prepare a secondary slurry; and
   (d) coating the secondary slurry on a current collector,
   wherein the first binder is at least one selected from the group consisting of N,N-bis [3-(triethoxysilyl)propyl] urea and polyethylene oxide (PEO),
   the electrode active material and the solid electrolyte are bonded by the first binder,
   the conductive agent is disposed in pores between the electrode active material and the solid electrolyte, and
   the electrode active material, the solid electrolyte and the conductive agent are uniformly mixed.

12. A secondary battery comprising the electrode of the all-solid-state battery according to claim 11.

13. The method according to claim 9, wherein a combined amount of the solid electrolyte and the additional solid electrolyte contained in the secondary slurry is 5 weight % to 10 weight % based on a total solid content.

14. The electrode according to claim 11, wherein the second binder is at least one selected from the group consisting of styrene-butadiene rubber-carbonyl methyl cellulose (SBR-CMC), polyacrylic acid (PAA) and poly(ethylene-co-propylene-co-5-methylene-2-norbornene).

* * * * *